(12) United States Patent
Gray et al.

(10) Patent No.: US 8,618,239 B2
(45) Date of Patent: Dec. 31, 2013

(54) SOLID-STAGE POLYMERIZATION SYSTEM FOR A LIQUID CRYSTALLINE POLYMER

(71) Applicant: Ticona LLC, Florence, KY (US)

(72) Inventors: Steven D. Gray, Mequon, WI (US); Robert Alan Deck, Richmond, TX (US); Bing Lu, Union, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 13/627,374

(22) Filed: Sep. 26, 2012

(65) Prior Publication Data

US 2013/0085253 A1    Apr. 4, 2013

Related U.S. Application Data

(60) Provisional application No. 61/541,331, filed on Sep. 30, 2011.

(51) Int. Cl.
*C08G 64/00* (2006.01)
*C08G 63/02* (2006.01)

(52) U.S. Cl.
USPC .......................................... 528/206; 422/134

(58) Field of Classification Search
USPC .......................................... 422/134; 528/206
See application file for complete search history.

(56) References Cited

U.S. PATENT DOCUMENTS

| | | | |
|---|---|---|---|
| 3,728,309 A | 4/1973 | Maxion | |
| 3,840,632 A | 10/1974 | Maxion | |
| 4,075,173 A | 2/1978 | Maruyama et al. | |
| 4,083,829 A | 4/1978 | Calundann et al. | |
| 4,161,470 A | 7/1979 | Calundann | |
| 4,184,996 A | 1/1980 | Calundann | |
| 4,219,461 A | 8/1980 | Calundann | |
| 4,256,624 A | 3/1981 | Calundann | |
| 4,279,803 A | 7/1981 | Calundann | |
| 4,318,841 A | 3/1982 | East et al. | |
| 4,330,457 A | 5/1982 | East et al. | |
| 4,337,190 A | 6/1982 | Calundann | |
| 4,339,375 A | 7/1982 | Calundann et al. | |
| 4,351,917 A | 9/1982 | Calundann et al. | |
| 4,351,918 A | 9/1982 | Charbonneau et al. | |
| 4,355,132 A | 10/1982 | East et al. | |
| 4,355,134 A | 10/1982 | Charbonneau et al. | |
| 4,375,530 A | 3/1983 | Hay et al. | |
| 4,393,191 A | 7/1983 | East | |
| 4,421,908 A | 12/1983 | East | |
| 4,429,105 A | 1/1984 | Charbonneau | |
| 4,434,262 A | 2/1984 | Buckley et al. | |
| 4,473,682 A | 9/1984 | Calundann et al. | |
| 4,522,974 A | 6/1985 | Calundann et al. | |
| 4,778,858 A | 10/1988 | Ginnings | |
| 4,994,546 A | 2/1991 | Stern et al. | |
| 5,204,443 A | 4/1993 | Lee et al. | |
| 5,214,073 A | 5/1993 | Fukawa et al. | |
| 5,541,240 A | 7/1996 | Makhija et al. | |
| 5,559,159 A | 9/1996 | Sublett et al. | |
| 5,616,680 A | 4/1997 | Linstid, III | |
| 5,912,289 A | 6/1999 | Komiya et al. | |
| 6,114,492 A | 9/2000 | Linstid, III et al. | |
| 6,348,163 B1 | 2/2002 | Long et al. | |
| 6,514,611 B1 | 2/2003 | Shepherd et al. | |
| 6,759,489 B1 | 7/2004 | Turkistani | |
| 7,482,411 B2 | 1/2009 | Penzo et al. | |
| 7,683,156 B2 | 3/2010 | Christel et al. | |
| 7,763,701 B2 | 7/2010 | Nichols et al. | |
| 7,829,656 B2 | 11/2010 | Nichols et al. | |
| 7,884,177 B2 | 2/2011 | Borer et al. | |
| 8,324,339 B2 | 12/2012 | Bruckmann | |
| 2007/0135613 A1 | 6/2007 | Christel et al. | |
| 2009/0093600 A1 | 4/2009 | Moore et al. | |
| 2011/0128743 A1 | 6/2011 | Matsumi et al. | |
| 2011/0229629 A1 | 9/2011 | Ito et al. | |
| 2013/0052446 A1* | 2/2013 | Nair et al. | 428/220 |
| 2013/0137845 A1 | 5/2013 | Kim et al. | |

FOREIGN PATENT DOCUMENTS

WO    WO 2004/058851 A1    7/2004

OTHER PUBLICATIONS

Search Report and Written Opinion for PCT/US2012/057213 dated Apr. 16, 2013, 10 pages.

* cited by examiner

*Primary Examiner* — Terressa Boykin
(74) *Attorney, Agent, or Firm* — Dority & Manning, P.A.

(57) ABSTRACT

A multi-stage process for forming a liquid crystalline polymer is provided. More particularly, the process includes acetylating one or more precursor monomers and melt-polymerizing the acetylated monomers to form a prepolymer in the form of a solid particulate material. Thereafter, the prepolymer is solid-state polymerized in a fluidized bed reactor that contains a porous surface (e.g., bed, plate, grate, etc.) on which the prepolymer is supported. While supported by this porous surface, the prepolymer can become "fluidized" with a heated stream of a gas (e.g., nitrogen). In this manner, a sufficient degree of turbulence is created to distribute heat evenly around the prepolymer and cause it to rapidly reach the target reaction temperature.

18 Claims, 2 Drawing Sheets

SOLID-STAGE POLYMERIZATION SYSTEM FOR A LIQUID CRYSTALLINE POLYMER

CROSS REFERENCE TO RELATED APPLICATION

The present application claims filing benefit of U.S. Provisional Patent Application Ser. No. 61/541,331 having a filing date of Sep. 30, 2011, which is incorporated herein by reference.

BACKGROUND OF THE INVENTION

Thermotropic liquid crystalline polymers are generally wholly aromatic condensation polymers that have relatively rigid and linear polymer chains so that they melt to form a liquid crystalline phase. Such polymers are commercially generated using bulk polymerization methodologies, such as melt acidolysis, which generally require the use of temperatures above the polymer melting point (260° C. to 380° C.) for extended periods of time. While wholly-aromatic polyesters display exceedingly high thermal stability, long-term heating at these high temperatures tends to lead to some degree of decomposition, which results in poorer color, increased volatiles, reduced product yield, and in extreme cases, compromised performance. Therefore, methods for reducing the temperature and overall time of exposure of these species are desired in the art.

One successful route for lowering the heat history of liquid crystal polymers (LCP's) involves generating a low molecular weight "prepolymer" species by standard routes, which is then subsequently heated at temperatures below the melting point of the polymer. This is referred to as "solid-state polymerization" and is typically used to provide higher molecular weight polymers suitable for injection molding, fiber spinning, and other end-use applications. Though the exact reasons are unknown, liquid crystalline polymers produced via solid-state polymerization tend to display enhanced thermal properties, such as higher heat distortion temperatures (HDT) and improved blister/off-gassing performance—both features being beneficial to commercial end-use applications. While advantageous from a property standpoint, standard solid-state polymerization methods are problematic. For instance, one such method involves heating the prepolymer in a tumble blended reactor. Unfortunately, however, this process requires long times to achieve high molecular weights owing to poor heat distribution/transfer from the reactor walls to the pellets. Thus, producing even medium molecular weight polymers in such systems can require solid-state cycle times higher than melt-polymerization production rates. This bottleneck can reduce the capacity of a plant to generate polymers with maximum thermal properties. Stated alternatively, the long cycle times required do not generally keep pace with the melt-polymerization production of the prepolymer. Additionally, solid-state polymerization times—despite the lower temperatures—add to the overall heat history of the materials, which is undesirable.

As such, a need currently exists for a method of improving the rate of the solid-state polymerization of a liquid crystalline polymer.

SUMMARY OF THE INVENTION

In accordance with one embodiment of the present invention, a method for forming a thermotropic, wholly aromatic liquid crystalline polymer is disclosed. The method comprises acetylating one or more precursor monomers for the liquid crystalline polymer; melt-polymerizing the acetylated monomers to form a liquid crystalline prepolymer that is in the form of a solid particulate material; feeding the prepolymer into a fluidized bed reactor; and supplying a heated gaseous stream into the fluidized bed to polymerize the prepolymer for a certain reaction time period. The heated gaseous stream increases the temperature of the prepolymer at a rate of about 2.0° C. per minute or more to a temperature of from about 200° C. to about 340° C. during at least a portion of the reaction time period.

In accordance with another embodiment of the present invention, a reactor system for forming a thermotropic, wholly aromatic liquid crystalline polymer is disclosed. The system comprises a reactor vessel for acetylating one or more precursor monomers for the polymer, one or more reactor vessels for melt-polymerizing the acetylated monomers to form a prepolymer in the form of a solid particulate material, and a fluidized bed reactor for solid-state polymerizing the prepolymer. The fluidized bed reactor contains a porous surface on which the prepolymer is capable of being disposed and through which a heated gaseous stream may pass to fluidize and heat the prepolymer.

Other features and aspects of the present invention are set forth in greater detail below.

BRIEF DESCRIPTION OF THE FIGURES

The present disclosure may be better understood with reference to the following figures.

DETAILED DESCRIPTION

Figure 1:
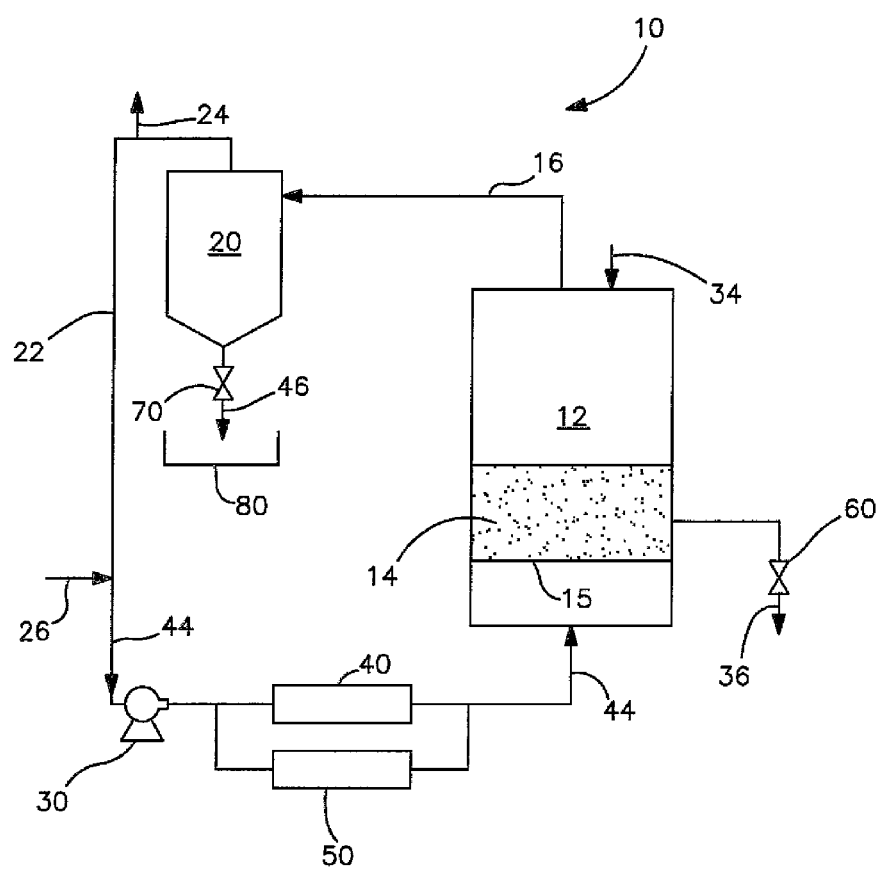
FIG. 1 is a schematic illustration of one embodiment of the present invention.

It is to be understood by one of ordinary skill in the art that the present discussion is a description of exemplary embodiments only, and is not intended as limiting the broader aspects of the present invention.

Generally speaking, the present invention is directed to a multi-stage process for forming a liquid crystalline polymer. More particularly, the process includes acetylating one or more precursor monomers and melt-polymerizing the acetylated monomers to form a prepolymer in the form of a solid particulate material. Thereafter, the prepolymer is solid-state polymerized in a fluidized bed reactor that contains a porous surface (e.g., bed, plate, grate, etc.) on which the prepolymer is supported. While supported by this porous surface, the prepolymer can become "fluidized" with a heated stream of a gas (e.g., nitrogen). In this manner, a sufficient degree of turbulence is created to distribute heat evenly around the prepolymer and cause it to rapidly reach the target reaction temperature. Without intending to be limited by theory, it is believed that such a fluidized bed reactor can allow the desired molecular weight to be reached at a faster rate than conventional solid-state polymerization reactors, thereby increasing processing efficiency and reducing cycle time. Various embodiments of the present invention will now be described in more detail below.

I. Acetylation

To initiate the formation of the liquid crystalline polymer, one or more precursor monomers for the liquid crystalline polymer may be supplied to a reactor vessel where they are acetylated. The precursor monomers may generally vary as is known in the art. For example, suitable thermotropic liquid crystalline polymers may include instance, aromatic polyesters, aromatic poly(esteramides), aromatic poly(estercarbonates), aromatic polyamides, etc., and may likewise contain repeating units formed from one or more aromatic hydroxycarboxylic acids, aromatic dicarboxylic acids, aromatic diols, aromatic aminocarboxylic acids, aromatic amines, aromatic diamines, etc., as well as combinations thereof.

Aromatic polyesters, for instance, may be obtained from (1) two or more aromatic hydroxycarboxylic acids; (2) at least one aromatic hydroxycarboxylic acid, at least one aromatic dicarboxylic acid, and at least one aromatic diol; and/or (3) at least one aromatic dicarboxylic acid and at least one aromatic diol. Examples of suitable aromatic hydroxycarboxylic acids include, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof. Examples of suitable aromatic dicarboxylic acids include terephthalic acid; isophthalic acid; 2,6-naphthalenedicarboxylic acid; diphenyl ether-4,4'-dicarboxylic acid; 1,6-naphthalenedicarboxylic acid; 2,7-naphthalenedicarboxylic acid; 4,4'-dicarboxybiphenyl; bis(4-carboxyphenyl)ether; bis(4-carboxyphenyl)butane; bis(4-carboxyphenyl)ethane; bis(3-carboxyphenyl)ether; bis(3-carboxyphenyl)ethane, etc., as well as alkyl, alkoxy, aryl and halogen substituents thereof. Examples of suitable aromatic dials include hydroquinone; resorcinol; 2,6-dihydroxynaphthalene; 2,7-dihydroxynaphthalene; 1,6-dihydroxynaphthalene; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof. In one particular embodiment, the aromatic polyester is derived from 4-hydroxybenzoic acid and 2,6-hydroxynaphthoic acid. The monomer units derived from 4-hydroxybenzoic acid may constitute from about 45% to about 85% (e.g., 73%) of the polymer on a mole basis and the monomer units derived from 2,6-hydroxynaphthoic acid may constitute from about 15% to about 55% (e.g., 27%) of the polymer on a mole basis. The synthesis and structure of these and other aromatic polyesters may be described in more detail in U.S. Pat. Nos. 4,161,470; 4,473,682; 4,522,974; 4,375,530; 4,318,841; 4,256,624; 4,219,461; 4,083,829; 4,184,996; 4,279,803; 4,337,190; 4,355,134; 4,429,105; 4,393,191; 4,421,908; 4,434,262; and 5,541,240.

Liquid crystalline polyesteramides may likewise be obtained from (1) at least one aromatic hydroxycarboxylic acid and at least one aromatic aminocarboxylic acid; (2) at least one aromatic hydroxycarboxylic acid, at least one aromatic dicarboxylic acid, and at least one aromatic amine and/or diamine optionally having phenolic hydroxy groups; and (3) at least one aromatic dicarboxylic acid and at least one aromatic amine and/or diamine optionally having phenolic hydroxy groups. Suitable aromatic amines and diamines may include, for instance, 3-aminophenol; 4-aminophenol; 1,4-phenylenediamine; 1,3-phenylenediamine, etc., as well as alkyl, alkoxy, aryl and halogen substituents thereof. In one particular embodiment, the aromatic polyesteramide is derived from 2,6-hydroxynaphthoic acid, terephthalic acid, and 4-aminophenol. The monomer units derived from 2,6-hydroxynaphthoic acid may constitute from about 35% to about 85% of the polymer on a mole basis (e.g., 60%), the monomer units derived from terephthalic acid may constitute from about 5% to about 50% (e.g., 20%) of the polymer on a mole basis, and the monomer units derived from 4-aminophenol may constitute from about 5% to about 50% (e.g., 20%) of the polymer on a mole basis. In another embodiment, the aromatic polyesteramide contains monomer units derived from 2,6-hydroxynaphthoic acid, and 4-hydroxybenzoic acid, and 4-aminophenol, as well as other optional monomers (e.g., 4,4'-dihydroxybiphenyl and/or terephthalic acid). The synthesis and structure of these and other aromatic poly(esteramides) may be described in more detail in U.S. Pat. Nos. 4,339,375; 4,355,132; 4,351,917; 4,330,457; 4,351,918; and 5,204,443.

Regardless of the particular precursor monomer(s) employed, acetylation may be accomplished by adding an acetylating agent (e.g., acetic anhydride) to one or more of the precursor monomers to form a reaction mixture. One particularly suitable technique for acetylating monomers may include, for instance, charging precursor monomers (e.g., 4-hydroxybenzoic acid and 2,6-hydroxynaphthoic acid) and acetic anhydride into a reactor and heating the mixture to acetylize a hydroxyl group of the monomers (e.g., forming acetoxy).

Acetylation is generally initiated at temperatures of about 90° C. Temperatures during acetylation typically range from between 90° C. to 250° C., in some embodiments from about 120° C. to about 240° C., and in some embodiments, from about 180° C. to about 230° C. The acetylation time period may also vary, but is typically from about 1 to about 15 hours, and in some embodiments, from about 4 to about 10 hours. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

To obtain both complete acetylation and maintenance of stoichiometric balance, it is generally desired to minimize the loss of the acetylating agent. For instance, acetic acid vaporizes at temperatures of about 118° C., and at higher temperatures (i.e., about 140° C.), acetic anhydride begins to vaporize. For these reasons, the acetylation reactor is typically equipped with a method for providing controlled vapor phase reflux. In one particular embodiment, the acetylation reactor is furnished with a reflux column (e.g., packed column) that is connected to a condenser which, in turn, is connected to a distillate receiver. The reflux column may help separate the acetylating agent, monomers, and any low molecular weight polymer intermediates from the reactor vapor and return them to the reactors. The column may also help distill acetic acid and other low boiling byproducts for removal. Providing the receiver with a device for pumping the cooled acetic acid back to the top of the reflux column offers a way to control the temperature of the vapor phase reflux, and minimize acetic anhydride loss or loss of volatile monomer acetate intermediates. If desired, a reboiler may also be coupled to the reflux column that is supplied with any suitable heating medium, such as steam, oil, etc. Among other things, the reboiler can help reduce the flow rate of reactants returning to the reactor vessel, thereby decreasing the overall duty requirement for the vessel. The reboiler can also help increase the rate at which temperature can be increased from the reflux temperature to the end temperature within the reactor vessel, thereby improving cycle time.

II. Melt-Polymerization

After acetylation is complete, the resulting composition may be melt-polymerized. Although not required, this is typically accomplished by transferring the acetylated monomer(s) to a separator reactor vessel for conducting the polycondensation reaction. Separation of acetylation and polycondensation in this manner allows simultaneous acetylation and polymerization reactions to be conducted. Further, it also allows the esters of certain types of monomers (e.g., aromatic diols and aromatic hydroxy-carboxylic acids) to be prepared at the same time that previously acetylated reactants are being polymerized, thereby decreasing the overall cycle time for the reactions. The multi-stage reactor system also allows the individual reactors to be more particularly tailored to their function. For instance, the polymerization reactor may be equipped with a vacuum to facilitate the removal of volatiles during the final stages of polycondensation.

If desired, one or more of the precursor monomers used to form the liquid crystalline polymer may be directly introduced to a reactor vessel without undergoing pre-acetylation. For instance, because aromatic dicarboxylic acids are not ordinarily soluble in an acetylated melt (e.g., terephthalic acid), it is generally desirable to add such materials to the melt-polymerization reactor. This allows the melt to be filtered prior to transfer from the acetylation vessel and minimizes the potential for diacid loss during melt transfer and clogging of the transfer line. Other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. The catalyst is typically added to the acetylation reactor rather than the polymerization reactor, although this is by no means a requirement.

The particular conditions and steps employed during the melt-polymerization reaction are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. For example, the reaction mixture is generally heated to an elevated temperature within the polymerization reactor vessel to initiate melt polycondensation of the reactants. This typically occurs within a temperature range of from about 210° C. to about 400° C., and in some embodiments, from about 250° C. to about 350° C. The melt-polymerization time period may also vary, but is typically from about 5 to about 15 hours, and in some embodiments, from about 8 to about 12 hours.

During polymerization, the reaction mixture may be relatively viscous and thus subjected to agitation to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. If desired, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

One or multiple reactor vessels may also be employed to melt-polymerize the monomers in the manner described above. In one particular embodiment, for example, melt-polymerization is accomplished in a two-step process in which the acetylated monomers are initially supplied to a first reactor vessel and heated to a temperature of from about 210° C. to about 350° C., in some embodiments from about 220° C. to about 320° C., and in some embodiments from about 230° C. to about 310° C. Thereafter, the partially polymerized monomers are supplied to a second reactor vessel where they are heated at a temperature of from about 210° C. to about 300° C., in some embodiments from about 215° C. to about 280° C., and in some embodiments, from about 220° C. to about 250° C. The use of multiple reactors can help reduce the cycle time required for the melt-polymerization process. If desired, the first reactor vessel and/or second reactor vessel may also employ a reflux column, such as described above, to help separate the acetylating agent, monomers, and any intermediates from the reactor vapor and return them to the reactors. A reboiler may also be coupled to the reflux column which, as described above, can help reduce the flow rate of reactants returning to the reactor vessel, thereby decreasing the overall duty requirement for the vessel.

The type of vessel(s) employed for the acetylation and melt polycondensation reactions are not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

III. Solid-State Polymerization

After acetylation and melt-polymerization, the resulting prepolymer is then subjected to a solid-state polymerization process. The solid-state polymerization system includes at least one fluidized bed reactor that allows the polymer to be maintained at the desired solid-state polymerization temperature for the desired residence time. In certain embodiments, a series of multiple fluidized bed reactors may be employed to achieve the desired polymer. Alternatively, only a single fluidized bed may be employed.

Referring to FIG. 1, for example, one particular embodiment of a fluidized bed reactor 10 that can be employed in the present invention is shown in more detail. Although a "batch" system is shown, it should be understood that "continuous" reactor systems are equally suitable for use in the present invention as is known in the art. As shown, the reactor 10 contains a reactor body 12 including a fluidized bed 14 of a prepolymer that is in the form of a solid particulate material (e.g., pellets, flakes, strands, etc.) and supported on a porous distribution plate 15. The distribution plate 15 can be of conventional design, for instance, a flat or dished plate perforated by a plurality of slots distributed that are disposed generally uniformly across its surface. The prepolymer material may be added via an inlet 34 that is located adjacent to the top of the reactor body 12. An inlet gaseous stream 44 is likewise supplied to the bottom of the reactor body 12 so that it passes through the distribution plate 15 and to the fluidized bed 14. In this manner, the gaseous stream can maintain the prepolymer material in a fluidized condition during solid-state polymerization. Suitable fluidizing gases may include, for instance, inert gases, such as nitrogen, helium, argon, neon, krypton, xenon, etc., as well as combinations thereof. The velocity of the gaseous stream 44 may vary and is generally set to ensure the polymer is fluidized well enough to ensure good heat transfer, but not so high as to lead to polymer being lost overhead. The gas flow velocity can be within a range of from about 5 to about 30 cubic meters ($m^3$) per minute per 100 pounds of the prepolymer added, and in some embodiments, from about 10 to about 25 $m^3$/min per 100 pounds of the prepolymer.

The temperature of the inlet gaseous stream 44 is generally kept within a certain range during the process to initiate and control the polymerization reaction. This heated gaseous stream 44 can thus help subject the reactor to a heating cycle in which the temperature of the prepolymer is rapidly increased to a reaction temperature. This "ramp up" period may be accomplished by heating the inlet gaseous stream 44 to a temperature of from about 220° C. to about 400° C., in some embodiments from about 230° C. to about 380° C., and in some embodiments, from about 240° C. to about 320° C. A heating device 40 (e.g., heat exchanger) may be employed to heat the gaseous stream 44, which can be supplied by a blower unit 30.

Among the various benefits provided by the present invention, it has been surprisingly discovered that the fluidized bed reaction system can allow the prepolymer to be heated at a faster rate during this "ramp up" stage than previously found with conventional systems. More particularly, during at least some portion of the ramp up stage of the heating cycle, the prepolymer may be heated at a rate of about 2.0° C./min or more, in some embodiments about 2.2° C./min or more, in some embodiments about 2.4° C./min or more, and in some embodiments, from about 2.6° C. to about 15° C./min. The ramp up stage may, for example, span for about 10 to about 120 minutes, and in some embodiments, from about 20 to about 100 minutes (e.g., 60 minutes). The rate of increase is determined by subtracting the temperature at a first time by the temperature at a second time, and then dividing this result by the difference between the first and second times. The temperature of the prepolymer attained during this stage may be from about 200° C. to about 340° C., in some embodiments from about 210° C. to about 320° C., and in some embodiments, from about 220° C. to about 310° C.

Once heated to the desired temperature, the prepolymer can be held within the aforementioned temperature range until the target molecular weight is achieved. The time period of this stage of the heating cycle will vary based on the temperature and target molecular weight. In most cases, however, the solid-state polymerization time will be from about 2 to about 12 hours, and in some embodiments, from about 4 to about 10 hours. Surprisingly, the present inventors have discovered that the rate of the "relative melt viscosity" increase during the reaction is greater with the fluidized bed system than previously found with conventional systems. For example, during at least some portion of solid-state polymerization, the prepolymer can experience a "relative melt viscosity" increase of about 0.30 hour$^{-1}$ or more, in some embodiments about 0.32 hour$^{-1}$ or more, and in some embodiments, from about 0.35 to about 0.50 hour$^{-1}$. The rate of the relative melt viscosity increase is determined by subtracting the "relative viscosity" at a first time by the "relative viscosity" at a second time, and then dividing this result by the difference between the first and second times. "Relative viscosity" is likewise determined by the dividing the melt viscosity of the polymer at a given time by the initial melt viscosity.

After the reaction is complete, heating is discontinued. In certain embodiments, the polymer may then undergo a rapid cooling cycle to inhibit over-polymerization and agglomeration once transferred to static pellet storage. This "ramp down" period may be accomplished by cooling the inlet gaseous stream 44 to a temperature of from about 50° C. to about 250° C., in some embodiments from about 100° C. to about 220° C., and in some embodiments, from about 125° C. to about 200° C. A cooling device 50 (e.g., chilling unit) may be employed to cool the gaseous stream 44. Similar to the "ramp up" stage, it has also been surprisingly discovered that the fluidized bed reaction system can allow the prepolymer to be cooled at a faster rate than previously found with conventional systems. This offers additional cycle time gains as the polymer can be more rapidly cooled to temperatures suitable for safe transfer and storage. More particularly, during the ramp down stage of the cooling cycle, the prepolymer may be cooled at a rate of about 1° C./min or more, in some embodiments about 1.2° C./min or more, and in some embodiments, in some embodiments about 1.5° C./min or more, and in some embodiments, from about 2° C. to about 10° C./min. The ramp down stage may span for about 10 to about 120 minutes, and in some embodiments, from about 25 to about 150 minutes (e.g., 60 minutes). The temperature of the prepolymer attained during this stage may likewise range from about from about 50° C. to about 250° C., in some embodiments from about 100° C. to about 220° C., and in some embodiments, from about 125° C. to about 200° C.

The resulting polymer 36 may be withdrawn from the reactor body 12 via a valve 60. The polymer may have a melt viscosity (at a temperature of 20° C. to 30° C. above the measured melting point (e.g., 360° C.) and shear rate of 1000 seconds$^{-1}$) of from about 10 to about 2,000 Pa-s, in some embodiments from about 15 to about 1,500 Pa-s, and in some embodiments, from about 20 to about 900 Pa-s. The polymer will also generally have a high number average molecular weight ($M_n$), such as about 2,000 grams per mole or more, in some embodiments from about 4,000 grams per mole to about 100,000 grams per mole, and in some embodiments, from about 5,000 to about 50,000 grams per mole. Of course, it is also possible to form polymers having a lower molecular weight, such as less than about 2,000 grams per mole, using the method of the present invention. The intrinsic viscosity of the polymer, which is generally proportional to molecular weight, may also be relatively high. For example, the intrinsic viscosity may be about 4 deciliters per gram ("dL/g") or more, in some embodiments about 5 dL/g or more, in some embodiments from about 6 to about 20 dL/g, and in some embodiments from about 7 to about 15 dL/g. Intrinsic viscosity may be determined in accordance with ISO-1628-5 using a 50/50 (v/v) mixture of pentafluorophenol and hexafluoroisopropanol. The melting point of the polymer may also range from about 250° C. to about 400° C., in some embodiments from about 270° C. to about 380° C., and in some embodiments, from about 300° C. to about 360° C. Likewise, the crystallization temperature may range from about 200° C. to about 400° C., in some embodiments from about 250° C. to about 350° C., and in some embodiments, from about 280° C. to about 320° C. The melting and crystallization temperatures may be determined as is well known in the art using differential scanning calorimetry ("DSC"), such as determined by ISO Test No. 11357.

Referring again to FIG. 1, the fluidizing gas may be optionally recycled via a stream 16. To remove byproducts that could inhibit the reaction rate or lead to volatiles in the final polymer, a stream 24 of recalculating gas can optionally be vented from the system and made up using a feed of fresh gas. Fines 46 can optionally be removed from the recycle stream 16 via a filtration device 20 and then passed through a valve 70 into a storage vessel 80. The filtered stream 22 may then be recycled back through the reactor system via the suction side of the blower unit 30 as shown.

If desired, the resulting polymer may also be combined with a wide variety of other types of components. For example, a filler material may be blended with the polymer to enhance strength. Examples of suitable filler materials may include, for instance, fibrous reinforcing materials, such as glass fibers, silica-alumina fibers, carbon fibers, etc.; particle fillers, such as calcium carbonate, talc, mica, clay, glass beads etc.; and so forth. When employed, such fillers may, for example, constitute from about 10 wt. % to about 90 wt. %, in some embodiments from about 20 wt. % to about 60 wt. %, and in some embodiments, from about 25 wt. % to about 55 wt. % of the blended polymer composition. Other known additives, such as antioxidants, heat stabilizers etc., may also be employed.

The solid-state polymerized polymer composition of the present invention may be employed in a wide variety of applications as is known in the art, such as blow molding, injection molding, rotational molding, sheet extrusion, thermoforming, etc. Shaped or molded articles that may be formed may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays. One particularly suitable molded part is an electrical connector. As is known in the art, such connects may include, for instance, an insulative housing, a plurality of contact modules inserted into the insulative housing, and a shield that encloses the insulative housing. If desired, the insulative housing and/or the shield can be molded from a polymer formed according to the present invention.

The present invention may be better understood with reference to the following examples.

Test Methods

Melt Viscosity:

The melt viscosity (Pa-s) may be determined in accordance with ISO Test No. 11443 at a temperature of 20° C. to 30° C. above the measured melting temperature (e.g., 360° C.) and at a shear rate of 1000 s$^{-1}$ using a Dynisco 7001 capillary rheometer. The rheometer orifice (die) may have a diameter of 1 mm, length of 20 mm, L/D ratio of 20.1, and an entrance angle of 180°. The diameter of the barrel may be 9.55 mm±0.005 mm and the length of the rod was 233.4 mm.

Melting and Crystallization Temperatures:

The melting temperature ("Tm") and crystallization temperature ("Tc") may be determined by differential scanning calorimetry ("DSC") as is known in the art. The melting temperature is the differential scanning calorimetry (DSC) peak melt temperature as determined by ISO Test No. 11357. The crystallization temperature may be determined from the cooling exotherm in the cooling cycle. Under the DSC procedure, samples may be heated and cooled at 20° C. per minute as stated in ISO Standard 10350 using DSC measurements conducted on a TA Q2000 Instrument.

EXAMPLE 1

Figure 2:
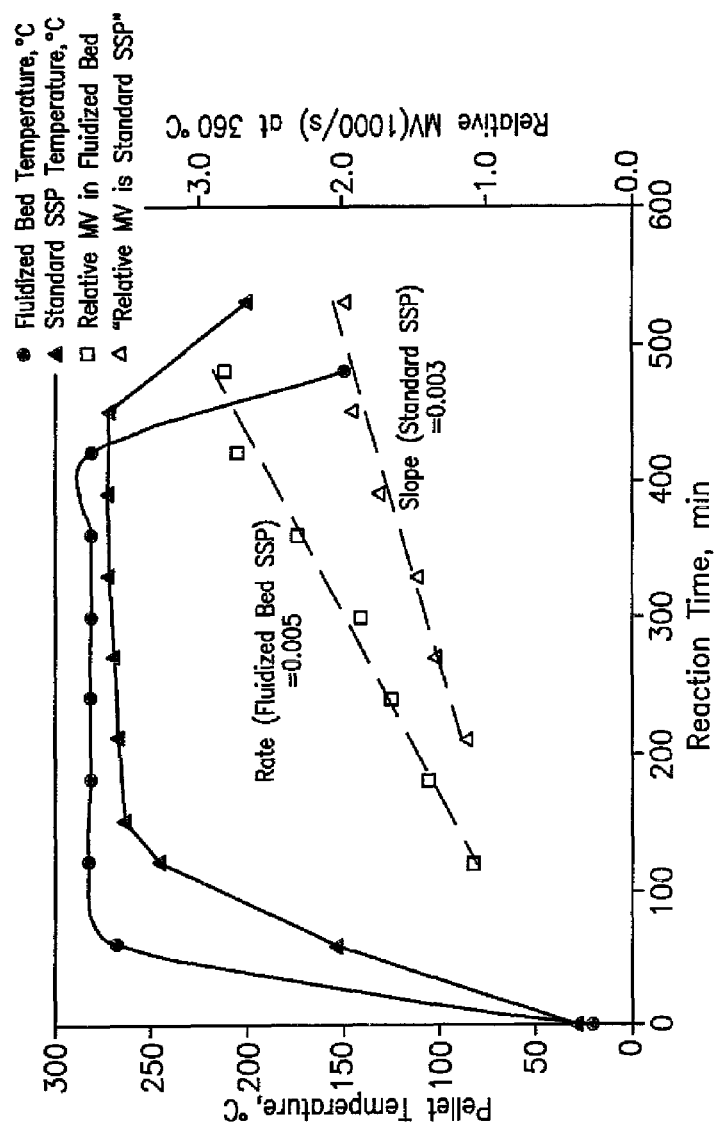
FIG. 2 is a graph showing pellet temperature versus reaction time for samples of Example 1.

A pilot-scale fluidized bed solid-state polymerization system is constructed as shown in FIG. 1. The fluidized bed is charged with 100 pounds of VECTRA® E950i pellets (Ticona, LLC of Florence, Ky.) and purged with nitrogen for approximately 15 minutes. The pellets are fluidized from the discharge side of a circulation pump at a calculated bed velocity of 500 to 670 ft$^3$/min. Using an exchanger, the nitrogen stream from the gas blower is employed to heat the pellets to 280° C. (due to small leaks in the pilot system, no nitrogen purge was required to remove undesired byproducts in this test). The bed is maintained at 280° C. for six (6) hours. A comparative example is also prepared with a conventional oil-heated, tumbled system. In this study, 200 pounds of the same base polymer formulation are solid-stated in a tumbled-drum system at a similar ultimate soak temperature described above (target pellet temperature 280° C.). Samples are collected hourly and tested for their temperature and melt viscosity. The results are provided below in Tables 1-2 and also shown in FIG. 2.

TABLE 1

Pellet Temperature and Melt Viscosity for the Fluidized Bed Reactor

| Time, min | Pellet Temp, ° C. | Rate of Pellet Temp. Change (° C./min) | MV (1000/s) at 360° C., Pa-s | Relative MV | Rate of Relative MV Increase (/hour) |
|---|---|---|---|---|---|
| 0 | 20 | — | 12.5 | — | — |
| 60 | 268 | +4.13 | 11.0 | 0.9 | — |
| 120 | 282 | +0.23 | 13.7 | 1.1 | +0.2 |
| 180 | 281 | −0.02 | 17.5 | 1.4 | +0.3 |
| 240 | 281 | 0 | 20.7 | 1.7 | +0.3 |
| 300 | 281 | 0 | 23.3 | 1.9 | +0.2 |
| 360 | 281 | 0 | 28.9 | 2.3 | +0.4 |
| 420 | 281 | 0 | 34.1 | 2.7 | +0.4 |
| 480 | 149 | −2.20 | 35.2 | 2.8 | +0.1 |

TABLE 2

Pellet Temperature and Melt Viscosity for a Tumble Reactor

| Time, min | Pellet Temp, ° C. | Rate of Pellet Temp. Change (° C./min) | MV (1000/s) at 360° C., Pa-s | Relative MV | Rate of Relative MV Increase (/hour) |
|---|---|---|---|---|---|
| 0.0 | 27.2 | — | 30.7 | — | — |
| 60.0 | 152.8 | +2.09 | — | — | — |
| 120.0 | 245.5 | +1.55 | — | — | — |
| 150.0 | 263.3 | +0.59 | — | — | — |
| 210.0 | 266.6 | +0.35 | 33.8 | 1.1 | — |
| 270.0 | 268.9 | +0.04 | 38.8 | 1.4 | +0.3 |
| 330.0 | 271.5 | +0.04 | 44.3 | 1.5 | +0.1 |
| 390.0 | 272.0 | +0.01 | 52.0 | 1.7 | +0.2 |
| 450.0 | 271.6 | −0.01 | 62.1 | 1.9 | +0.2 |
| 530.0 | 199.9 | −0.90 | 63.6 | 2.0 | +0.1 |

As shown, the ramp up stage of the heating cycle is significantly faster with the fluidized bed system of the present invention. Namely, the target 280° C. soak temperature is reached in the fluidized bed system approximately 2 times faster than in the tumbled system. Once heating is discontinued in the fluidized system, the temperature also drops much more rapidly than the tumbled-drum unit. Both of these features suggest that the fluidized system will have substantially lower cycle times in large scale production. A particularly surprising result is that the fluidized bed system appears to display a more rapid increase in molecular weight than samples generated under standard tumble blender systems. This is seen in the rate of relative MV increase [$MV_{at\ run\ time}/MV_{initial}$]. As a function of time, the 0.005 slope for the relative MV increase is 1.66 times greater than the 0.003 fitted line drawn for the tumble blended sample data. This somewhat surprising result suggests even greaterthan-anticipated cycle time benefits may be seen employing the fluidized bed of the present invention.

EXAMPLE 2

Samples prepared in Example 1 are compounded with glass fibers to provide reinforced samples using standard melt mixing methods known in the art. The thermal and mechanical properties of molded parts made from 30% glass-filled polymers are provided below in Table 3.

TABLE 3

Physical Properties

|  | Tumble Blender | Fluidized Bed |
|---|---|---|
| MV(1000/s) at 360° C., Pa-s | 43.6 | 64.2 |
| Pellet Color L | 57.3 | 61.6 |
| Pellet Color a | 2.1 | 1.8 |
| Pellet Color b | 13.4 | 14.7 |
| Tm, ° C. | 332 | 335 |
| Tc, ° C. | 285 | 287 |
| DTUL, ° C. | 260 | 269 |
| BFT, ° C. | 270 | 280 |
| Flex. Modulus, MPa | 16,665 | 16,726 |
| Break Stress, MPa | 172.3 | 177.8 |
| Break Strain, % | 1.86 | 2.04 |
| Color L (as molded) | 83.5 | 85.1 |
| Color a (as molded) | 0.30 | −0.12 |
| Color b (as molded) | 18.2 | 16.7 |

As shown, no compromise is seen in the polymer properties employing a fluidized-bed system. Interestingly, the color of the final molded parts of the fluidized bed material—despite the higher melt viscosity—is improved. This suggests that the inert atmosphere and low heat history could offer unexpected benefits to color. The blister-free temperature ("BFT") is also not compromised despite the lower overall time of the fluidized-bed process. Finally, the physical properties of 30% glass filled grades are not compromised using the new process. Though slightly higher properties are seen for the fluidized bed materials, the upward shift in deflection temperature under load ("DTUL") and BFT relates at least in part to the higher melt viscosity of the fluidized bed sample relative to the control sample.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a thermotropic, wholly aromatic liquid crystalline polymer, the method comprising:
   acetylating one or more precursor monomers for the liquid crystalline polymer;
   melt-polymerizing the acetylated monomers to form a liquid crystalline prepolymer that is in the form of a solid particulate material;
   feeding the prepolymer into a fluidized bed reactor; and
   supplying a heated gaseous stream into the fluidized bed to polymerize the prepolymer for a certain reaction time period, the heated gaseous stream increasing the temperature of the prepolymer at a rate of about 2.0° C. per minute or more to a temperature of from about 200° C. to about 340° C. during at least a portion of the reaction time period.

2. The method of claim 1, wherein the heated gaseous stream increases the temperature of the prepolymer at a rate of about 2.2° C. per minute or more during at least a portion of the reaction time period.

3. The method of claim 1, wherein the heated gaseous stream increases the temperature of the prepolymer to a temperature of from about 220° C. to about 310° C.

4. The method of claim 1, wherein the prepolymer is polymerized in a single fluidized bed reactor.

5. The method of claim 1, wherein the heated gaseous stream is supplied at a temperature of from about 220° C. to about 400° C. and a gas flow velocity of from about 5 $m^3$/min to about 30 $m^3$/min per 100 pounds of the prepolymer.

6. The method of claim 1, wherein the prepolymer is cooled to a temperature of from about 50° C. to about 250° C. for a certain period of cooling time upon being polymerized.

7. The method of claim 6, wherein the prepolymer is cooled at a rate of about 1° C. per minute or more for at least a portion of the cooling time period.

8. The method of claim 6, wherein the prepolymer is cooled at a rate of about 1.5° C. per minute or more for at least a portion of the cooling time period.

9. The method of claim 1, wherein the precursor monomers are selected from the group consisting of aromatic hydroxycarboxylic acids, aromatic dicarboxylic acids, aromatic diols, aromatic amines, aromatic diamines, and combinations thereof.

10. The method of claim 9, wherein the precursor monomers comprise two or more aromatic hydroxycarboxylic acids.

11. The method of claim 10, wherein the precursor monomers comprise an aromatic hydroxycarboxylic acid, aromatic amine, and aromatic dicarboxylic acid.

12. The method of claim 1, wherein acetylation and melt-polymerization are conducted in separate reactor vessels.

13. The method of claim 12, wherein acetylation is conducted in one reactor vessel, and wherein melt-polymerization is conducted in multiple reactor vessels.

14. The method of claim 13, further comprising supplying an acetylating agent and one or more precursor monomers to the reactor vessel for conducting acetylation.

15. The method of claim 14, wherein the acetylating agent is acetic anhydride.

16. A polymer composition that comprises a thermotropic, wholly aromatic liquid crystalline polymer formed by the method of claim 1.

17. A molded part comprising the polymer composition of claim 16.

18. A reactor system for forming a thermotropic, wholly aromatic liquid crystalline polymer, the system comprising a reactor vessel for acetylating one or more precursor monomers for the polymer, one or more reactor vessels for melt-polymerizing the acetylated monomers to form a prepolymer in the form of a solid particulate material, and a fluidized bed reactor for solid-state polymerizing the prepolymer, wherein the fluidized bed reactor contains a porous surface on which the prepolymer is capable of being disposed and through which a heated gaseous stream may pass to fluidize and heat the prepolymer.

* * * * *